United States Patent [19]

Ukihashi et al.

[11] 4,218,542
[45] Aug. 19, 1980

[54] CATION EXCHANGE MEMBRANE OF FLUORINATED POLYMER CONTAINING POLYTETRAFLUOROETHYLENE FIBRILS FOR ELECTROLYSIS AND PREPARATION THEREOF

[75] Inventors: Hiroshi Ukihashi, Tokyo; Tatsuro Asawa; Tomoki Gunjima, both of Yokohama, all of Japan

[73] Assignee: Asahi Glass Company Limited, Tokyo, Japan

[21] Appl. No.: 909,019

[22] Filed: May 24, 1978

[30] Foreign Application Priority Data

Jun. 3, 1977 [JP] Japan .................................. 52-64900

[51] Int. Cl.² .......................... C25B 13/04; C08J 5/22
[52] U.S. Cl. ...................................... 521/27; 521/28
[58] Field of Search ...................... 521/27, 28; 428/421

[56] References Cited

U.S. PATENT DOCUMENTS

| | | | |
|---|---|---|---|
| 2,936,301 | 5/1960 | Thomas et al. | 428/402 |
| 3,027,601 | 4/1962 | Barry | 428/421 |
| 3,365,355 | 1/1968 | Netsch | 428/421 |
| 3,849,243 | 11/1974 | Grot | 521/27 |
| 3,960,651 | 6/1976 | Kometani et al. | 428/421 |
| 3,962,373 | 6/1976 | Petrucelli | 428/421 |

FOREIGN PATENT DOCUMENTS

| | | | |
|---|---|---|---|
| 51-46589 | 4/1976 | Japan | 521/27 |
| 52-23192 | 2/1977 | Japan | 521/27 |
| 52-24994 | 2/1977 | Japan | 521/27 |

*Primary Examiner*—Joseph L. Schofer
*Assistant Examiner*—Peter F. Kulkosky
*Attorney, Agent, or Firm*—Oblon, Fisher, Spivak, McClelland & Maier

[57] ABSTRACT

A cation exchange membrane of a fluorinated polymer is formed by incorporating fibrils of polytetrafluoroethylene in a cation exchange resin of a fluorinated polymer having sulfonic acid type ion exchange groups which has high chemical resistances such as chlorine resistance, oxidation resistance and alkaline resistance, in an electrolysis.

11 Claims, No Drawings

CATION EXCHANGE MEMBRANE OF FLUORINATED POLYMER CONTAINING POLYTETRAFLUOROETHYLENE FIBRILS FOR ELECTROLYSIS AND PREPARATION THEREOF

BACKGROUND OF THE INVENTION

1. Field of the Invention

The present invention relates to a cation exchange membrane of a fluorinated polymer and electrolysis and a preparation thereof. More particularly, it relates to a cation exchange membrane of a fluorinated polymer having good electrochemical properties and mechanical properties and high chemical resistances such as chlorine resistance and alkaline resistance and thermal stability which is especially suitable as a cation exchange membrane for an electrolysis of an aqueous solution of an alkali metal chloride.

2. Description of the Prior Arts

Recently, it has been proposed to use a cation exchange membrane for a production of an alkali metal hydroxide and chlorine in high purity instead of a conventional asbestos diaphragm for electrolysis.

It has been known that a membrane of a fluorinated polymer has desirable characteristics as the cation exchange membrane because of the requirements of high chemical resistances such as oxidation resistance, chlorine resistance and alkaline resistance and heat resistance.

The cation exchange membranes made of a copolymer of a fluorinated olefin and a fluorinated monomer having sulfonic acid group or a functional group which can be converted to sulfonic acid group such as the copolymer of $CF=CF_2$ and $CF_2=CFOCF_2CF(CF_3)O(CF_2)_2SO_2F$ or a copolymer of a fluorinated olefin and a fluorinated monomer having carboxylic acid group or a functional group which can be converted to carboxylic acid group such as the copolymer of $CF_2=CF_2$ and $CF_2=CFO(CF_2)_3COOCH_3$ and the copolymer of $CF_2=CF_2$ and $CF_2=CFOCF_2CF(CF_3)O(CF_2)_3COOCH_3$ have been known as the membranes having good electrolytic characteristics, and high chemical resistances such as chlorine resistance and alkaline resistance.

The former of the cation exchange membranes of the fluorinated polymer having sulfonic acid groups have been used as cation exchange membranes for electrolysis because the electrolysis can be performed in relatively high current efficiency under low electrolytic voltage by using the cation exchange membrane in an electrolysis for producing relatively low concentration such as 15 to 30% of alkali metal hydroxide.

However, when the cation exchange membrane of the fluorinated polymer having good electrochemical characteristics and high chemical resistances such as chlorine resistance and alkaline resistance, is used for the electrolysis, there is a disadvantage of unsatisfactory mechanical characteristics.

The cation exchange membrane contacts with an alkali metal hydroxide in relatively high concentration on one side and contacts with an alkali metal chloride in the other side in the electrolysis. Moreover, the different pressures of the different gases are respectively applied to the membrane, whereby the phenomena of partial swelling and contraction of the membrane are caused. Furthermore, the hardening of the membrane in ageing may be caused whereby the creases, crackings and laminal peeling of the membrane may be caused to form pin holes which cause the contamination of the raw material of an alkali metal chloride into the alkali metal hydroxide and the decrease of the current efficiency.

Heretofore, in order to improve the mechanical strength of the cation exchange membrane, it has been known to reinforce the membrane by disposing a reinforcing material such as fabric or unwoven fabric of polypropylene, polyvinyl chloride, polyvinyliden fluoride, polytetrafluoroethylene in the membrane.

In accordance with such manner, the dimensional stability of the membrane is improved however the mechanical strength against the severe condition caused in the electrolysis is not satisfactorily improved.

In said reinforcement, the electric characteristics such as the increase of electric resistance of the cation exchange membrane are deteriorated and the cost of the reinforcing material is expensive.

SUMMARY OF THE INVENTION

It is an object of the present invention to provide a cation exchange membrane of fluorinated polymer for electrolysis which has excellent mechanical properties being durable against the condition caused in the electrolysis without deteriorating the electric characteristics, and which can be prepared in low cost.

It is an another object of the present invention to provide an effective and economical process for preparing a cation exchange membrane of fluorinated polymer as described above.

The foregoing and other objects of the present invention have been attained by providing a cation exchange membrane of a fluorinated polymer in which fibrils of polytetrafluoroethylene are incorporated in the cation exchange fluorinated polymer having sulfonic acid groups or functional groups which can be converted to sulfonic acid groups and which has high chemical resistances in an electrolysis.

DETAILED DESCRIPTION OF THE PREFERRED EMBODIMENTS

The sulfonic acid type cation exchange membranes of the present invention have excellent chemical resistances such as chlorine resistance, oxidation resistance and alkaline resistance given by the fluorinated polymers especially perfluorocarbon polymers and good electrochemical and mechanical characteristics in comparison with the membrane obtained by the conventional reinforcing method using woven or non-woven fabric.

The inventors have found that the strength of the membrane for preventing the formation of the creases, crackings and laminal peeling in the electrolysis is closely concerned on the flexural strength (folding endurance), the wearing resistance and the edge bursting strength of the membrane rather than the tear strength reinforced with the conventional fabric. The inventors have further found that the flexural strength, the wearing resistance and the edge bursting strength of the cation exchange membrane of a fluorinated polymer having sulfonic acid groups are remarkably improved by the blending of the fibrils of polytetrafluoroethylene.

As described above the amount of the fibrils of polytetrafluoroethylene incorporated in the fluorinated polymer having sulfonic acid groups is important factor to attain the objects of the present invention.

When the amount of the fibrils is not suitable, the unpredictable phenomenon of the formation of various foams in the membrane in a long operation of the electrolysis is caused.

The mechanical strength of the membrane having the foams is decreased at the parts of the foam whereby the creases, crackings and pin holes are easily formed at the parts of the foams and the electrical characteristics of the membrane are also deteriorated.

The inventors have found that the membrane having desired characteristics could be obtained by incorporating the fibrils of polytetrafluoroethylene at a small ratio of 0.5 to 4.0 wt. % to the total of the fibrils and the cation exchange resin of the fluorinated polymer, which is unpredictable from the viewpoint of the reinforcement of the membrane.

The mechanical strength of the membrane can be improved as desired for the membrane used for the electrolysis even though the amount of the fibrils is unpredictably small.

Since the amount of the fibrils of polytetrafluoroethylene can be small to attain the object of the invention, the higher melt fluidity can be obtained in the fabrication of the cation exchange membrane to give superior fabricatability into the membrane and the cost of reinforcement of the membrane is remarkably decreased.

The fibrils of polytetrafluoroethylene incorporated in the cation exchange resin can be prepared by using polytetrafluoroethylenes which can be formed in fibrils of three dimensional network structure of branches or spider web by applying share stress to the polymer.

The polytetrafluoroethylenes can be fine powder obtained by an emulsion polymerization or molding powder obtained by a suspension polymerization.

It is preferable to use particles of polytetrafluoroethylene having a specific surface area of 3 to 30 m$^2$/g preferably 6 to 20 m$^2$/g and a primary particle diameter of less than 5μ preferably 3 to 0.03μ and a secondary particle diameter of less than 5 mm preferably less than 3 mm.

The polytetrafluoroethylene can be in the form of powder formed by pulverizing, at low temperature preferably $-10°\sim15°$ C., the molding powder obtained by the suspension polymerization of tetrafluoroethylene. However, it is optimum to use the fine powder obtained by the emulsion polymerization of tetrafluoroethylene to give said characteristics.

The fine powder can be obtained by an emulsion polymerization of tetrafluoroethylene in an aqueous medium by the conventional method.

In the present invention, the aqueous emulsion of polytetrafluoroethylene and the fine powder obtained by a coagulation of the aqueous emulsion can be used for forming the fibrils.

The polytetrafluoroethylenes can be homopolymers of tetrafluoroethylene as well as copolymers of $CF_2=CF_2$ and a comonomer of

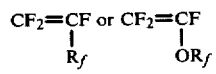

wherein R$_f$ represents a C$_1$-C$_{10}$ perfluoroalkyl group; or a comonomer of $CF_2=CFCl$ etc. at a ratio of less than 5 mole % of the comonomer units.

The molecular weight of the polytetrafluoroethylene used in the present invention is not critical and it is preferably more than 2,000,000 from the viewpoint of the properties of the obtained membrane.

As described above, the amount of the fibrils of polytetrafluoroethylene is important factor and it is preferable in a range of 0.5 to 4.0 wt. % especially 1.0 to 2.8 wt. % to a total of the fibrils and the cation exchange resin. When the amount of the fibrils is too small, the effect for improving the mechanical strength is not enough high whereas when the amount of the fibrils is too much, the formation of foam in the electrolysis and the difficulty of fabrication into the membrane are disadvantageously caused and the fabricatability into the membrane become difficulty.

As the fibrils of polytetrafluoroethylene can be incorporated in the action exchange resin by various methods.

From the veiwpoints of fabricatability, economy and the characteristics of the resulting cation exchange membrane, it is preferable to mix the polytetrafluoroethylene with the cation exchange resin under applying shear stress to the mixture at the time of mixing or after the mixing to form the fibrils of polytetrafluoroethylene.

The fibrils are formed by applying shear stress to the polytetrafluoroethylene by kneading the mixture of the polytetrafluoroethylene and the cation exchange resin with a roll mill.

In the formation of the fibrils, the convention methods for blending or kneading of plastics such as the kneading in the two roll mill, the kneading in a Bumbury mixer, the kneading in an uniaxial or biaxial extruder can be employed.

In the operation, the shear stress is preferably higher than 10$^5$ dyn/cm$^2$ and the shear velocity is preferably higher than 0.1 sec$^{-1}$ and the temperature is preferably higher than 70° C. especially higher than 100° C. and lower than the melting point of the polytetrafluoroethylene and the time is not critical and preferably in a range of 1 minutes to 1 hour.

The mixing of the polytetrafluoroethylene and the cation exchange resin can be carried out at the time of forming the fibrils of the polytetrafluoroethylene. The mixture of the polytetrafluoroethylene and the cation exchange resin in the dry blend or the wet blend can be kneaded on a two roll mill to form the fibrils of the polytetrafluoroethylene.

The cation exchange resins used for preparing the cation exchange membrane of the present invention have sulfonic acid type ion exchange groups which include the group having the formula

wherein M represents hydrogen or an alkali metal atom, preferably sodium or potassium, or the functional group which can be converted to sulfonic acid group in an electrolysis.

From the viewpoints of the electrochemical characteristics of the membrane, the ion exchange capacity of the cation exchange resin used in the present invention is preferably in a range of 0.5 to 2.5, especially 0.7–1.0 meq/g.dry polymer. When the molecular weight is shown by the temperature (T$_Q$) to give a volumetric melt flow rate of 100 m$^3$/sec., it is preferably in a range of 130° to 350° C. especially 160° to 300° C. from the viewpoints of the electrochemical and mechanical characteristics.

The cation exchange fluorinated polymers used for preparing the cation exchange membrane are preferably perfluorocarbon polymers which have high chemical resistances such as chlorine resistance and alkaline resistance as those of the polytetrafluoroethylene which forms the fibrils in the membrane.

The copolymers having the following units of (a) and (b) are preferably used as the fluoroinated cation exchange resin.

(a) $(CF_2-CXX')$ (b) $(CF_2-CX)$
      $\phantom{(CF_2-C}|$
      $\phantom{(CF_2-C}Y$ wherein X represents fluorine, or $-CF_3$; X' represents X or $CF_3(CF_2)_{\overline{m}}$; m represents 1 to 5; and Y represents

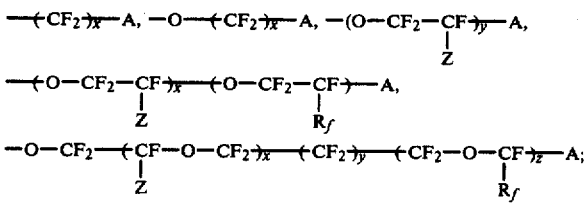

wherein x, y and x respectively represent 1 to 10; Z and $R_f$ respectively represent $-F$ or a $C_1-C_{10}$ perfluoroalkyl group; A represents $-SO_3M$, or a combination of $-SO_3M$ and a group which can be acted as ion exchange group such as $-SO_2NH_2$, $-SO_2NHR$, $-SO_2-NH-(CH_2)_n-NH_2$ or $-COOM$ wherein M represents hydrogen or alkali metal atom and R represents a $C_1-C_{10}$ alkyl group and n represents 1 to 10.

The copolymer having the units of (a) and (b) preferably contains the units (b) at a ratio of 5 to 40 mole % so as to give the above-mentioned ion exchange capacity to the membrane.

The ion exchange group of the fluorinated cation exchange resin which is mixed with the polytetrafluoroethylene is preferably $-SO_2F$ from the viewpoints of easy fabricatability and less thermal decomposition in the formation of the fibrils of the polytetrafluoroethylene.

In the production of the fluorinated copolymers used as the cation exchange resin, the membrane can be modified by using two or more said monomer or by copolymerizing the other monomer. For example, the flexibility is imparted to the resulting membrane by using $CF_2=CFOR_f$ wherein $R_f$ represents a $C_1-C_{10}$ perfluoroalkyl group or the mechanical strength of the membrane is increased by partially crosslinking a small amount of a divinyl monomer such as $CF_2=CF-CF=CF_2$ or $CF_2=CFO(CF_2)_{1-4}OCF=CF_2$ so as to impart the above-mentioned volumetric melt flow to the resulting copolymer.

The copolymerization of a fluorinated olefin and a comonomer having sulfonic acid group or a functional group which can be converted to sulfonic acid group, and optionally the other monomer, can be carried out by a catalytic polymerization, a thermal polymerization or a radiation-induced polymerization, optionally by using a solvent such as halohydrocarbons, in the suitable polymerization system such as the solution polymerization, the emulsion polymerization or the suspension polymerization.

The resulting copolymer is mixed with the polytetrafluoroethylene and the fibrils of the polytetrafluoroethylene are formed.

The following three processes are typical processes for fabrication of the mixture of the polytetrafluoroethylene and the cation exchange resin into a membrane.

(1) The polytetrafluoroethylene is mixed with the cation exchange resin and the formation of the fibrils of the polytetrafluoroethylene and the fabrication of the cation exchange resin into a membrane are continuously carried out by using an extruder or a calender molding machine.

(2) The mixing and the formation of the fibrils are carried out by using a kneading roll and the mixture of the cation exchange resin and the fibrils of the polytetrafluoroethylene is extruded by an extruder to fabricate the membrane.

(3) The mixing, the formation of the fibrils and the fabrication of the membrane are separately carried out.

In the fabrication of the membrane, the calendering method, the T-die extruding method, the inflation extruding method, the press-molding method or the powder molding method can be employed.

The resulting cation exchange membrane of the present invention has the structure being satisfactorily reinforced. Accordingly, it is not necessary to further reinforce the membrane with the conventional reinforcing material. However, it is possible to further improve the mechanical characteristics by supporting the membrane on the conventional reinforcing material such as a fabric of cloth or net or a non-woven fabric. It is also possible to eliminate inner strain by heating the membrane at the temperature of lower than the melting point of the polytetrafluoroethylene.

When the functional groups of the resulting cation exchange membrane are in the form of non-ion exchange groups such as $-SO_2F$, the functional groups are converted to the groups of $-SO_3M$ (M is defined above) by a hydrolysis with an alkali metal hydroxide such as sodium hydroxide; or to the groups of $-SO_2NH_2$ by a treatment with ammonia; or to the groups of $-SO_2NHR$ or $-SO_2NH(CH_2)_nNH_2$ (R and n are defined above) by a treatment with the corresponding amine; or to the groups of $-SO_2H$ or $-COOH$ by a treatment with reducing agent such as hydroiodic acid. These methods of the conversion are described in U.S. Pat. Nos. 3,784,399, 3,849,243, 4,026,783, 4,030,988, West German Unexamined Publication No. 2,630,584 and French Pat. No. 2,317,323.

The process for producing an alkali metal hydroxide and chlorine by an electrolysis of an equeous solution of an alkali metal chloride using the cation exchange membrane of present invention can be the conventional processes, for example, the electrolysis is carried out in a cell voltage of 2.3 to 5.5 volt and a current density of 10 to 100 A/dm$^2$. The anode used in the electrolysis can be graphite or an anticorrosive electrode having dimensional stability which is made of a titanium substrate coated with a platinum group metal or an oxide of a platinum group metal. The electrolyte cell system can be unipolar or multipolar type.

Thus, in the case of the two compartment cell wherein the anode compartment and the cathode compartment are formed by partitioning the anode and the cathode with the cation exchange membrane of the fluorinated polymer of the present invention and an aqueous solution of an alkali metal chloride is fed into the anode compartment and water or dilute aqueous solution of alkali metal chloride is fed into the cathode compartment. For example, sodium hydroxide having high concentration such as 15 to 30% can be obtained by electrolyzing an aqueous solution of sodium chloride having a concentration of 2.5 to 4.5 N at 80° to 120° C. in a current density of 10 to 50 A/dm$^2$.

A further understanding can be obtained by reference to certain specific examples which are provided herein for purposes of illustration only and are not intended to be limited unless otherwise specified.

In the examples, the ion exchange capacity of the cation exchange membrane is measured as follows.

A cation exchange membrane is immersed into 1 N—HCl at 60° C. for 5 hours to completely convert it to an H-type membrane, and then, the membrane is washed with water to be free of HCl. Then, 0.5 g of the H-type membrane is immersed into a solution prepared by adding 25 ml of water to 25 ml of 0.1 N—NaOH to completely convert it to a Na+ type membrane and then, the membrane is taken out and the amount of NaOH in the solution is measured by a back titration with 0.1 N—HCl.

The tear strength of the membrane is measured as the tearing strength in the direction of extruding the polymer into the membrane, pursuant to the method of Japanese Industrial Standard Z1702 (1962).

The flexural strength (folding endurance) is measured by tester manufactured by Toyo Seiki K.K. pursuant to the method of Japanese Industrial Standard P 8115 by using samples having a width of 1.5 cm, a thickness of 300μ and a length of 14 cm in the condition of a weight of 1.5 Kg, an angle of 135° and a rotation of 100 r.p.m. The result is shown as the number of times of the bending at the break of the membrane.

A wearing is measured by the taper wearing test pursuant to Japanese Industrial Standard K 7204 wherein the cation exchange membrane having functional groups of —SO$_3$Na is washed with water and dried for 24 hours in air and the test is carried out at 25° C. in the condition of a wearing wheel of 1,000 g and a friction of 1000 times.

The edge bursting strength is measured by disposing a tack having a needle of a diameter of 2.9 mm and a length of 3 mm on a rubber plate of a bursting strength tester manufactured by Toyo Seiki K.K. and disposing the Na+ type cation exchange membrane on the needle and applying the pressure to the rubber plate pursuant to the bursting test of Japanese Industrial Standard 8112 to find the pressure (Kg/cm$^2$) at the time breaking the membrane by the needle of the tack.

The specific surface area is measured by the nitrogen gas adsorption method at low temperature.

The volumetric melt flow rate is measured by extending 1 g of a sample through a nozzle having a diameter of 1 mm and a length of 2 mm under a pressure of 30 Kg/cm$^2$ by a flow tester.

The particle size of the sample is measured by an observation by a scanning type electron microscope.

EXAMPLE 1

In a 10 liter stainless steel autoclave equipped with a baffle, 5,000 g of deionized water, 2.5 g of disuccinic acid peroxide, 7.5 g of ammonium perfluorooctanate and 300 g of paraffin wax (melting point of 56° to 58° C.) were charged and the gases were purged and tetrafluoroethylene was fed to the pressure of 2 Kg/cm$^2$ (gauge) and the autoclave was heated under stirring. When the content was heated to 65° C., tetrafluoroethylene was further fed to raise the pressure to about 26 Kg/cm$^2$ (gauge) in the vessel.

The autoclave was heated to 80° C. in the vessel and the temperature was maintained. The pressure in the vessel raised at the beginning depending upon the decrease of solubility caused by the rise of the temperature, however it fall depending upon the consumption of the monomer by the initiation of the polymerization.

Tetrafluoroethylene was fed so as to maintain the pressure of 27 Kg/cm$^2$ (gauge) in the vessel. When 2.7 Kg of tetrafluoroethylene was attained, the feed of the monomer and the stirring were stopped and the unreacted monomer was discharged from the autoclave to stop the polymerization.

The resulting latex containing 35 wt. % of polytetrafluoroethylene was diluted with a deionized water to 3 times and the polytetrafluoroethylene was coagulated under stirring at high speed, and then, it was granulated, washed with water and dried to obtain a fine powder of polytetrafluoroethylene having a specific surface area of 8.5 m$^2$/g and a secondary particle diameter of 630μ.

On the other hand, a copolymer of $CF_2=CF_2$ and $CF_2=CFOCF_2CF(CF_3)O(CF_2)_2SO_2F$ having an ion exchange capacity of 0.80 meq/g polymer and $T_Q$ (temperature for a volumetric melt flow rate of 100 m$^3$/sec.) of 280° C. was dispersed in trichlorotrifluoroethane. The dispersion was stirred at 5,000 r.p.m. and the polytetrafluoroethylene was added so as to give four compositions A, B, C and D shown in Table 1.

Each of the mixtures was dried to remove trichlorotrifluoroethane and it was kneaded on the two roll mill having a length of 8 inch in the condition of a roll gap of 2 mm, a temperature of 200° C., a roll speed of 8 r.p.m. and 16 r.p.m. for 10 minutes to form fibrils of polytetrafluoroethylene. The mass of the mixture of the copolymer and the fibrils of polytetrafluoroethylene was cut into pellets having a size of 1 cm$^2$ and the pellets were pressed by a press machine at 280° C. under the pressure of 30 Kg/cm$^2$ to form a membrane having a thickness of 280μ and a size of 20 cm×20 cm.

The membrane was hydrolyzed in a solution of 15% of dimethyl sulfoxide, 5% of NaOH and 80% of water at 100° C. to convert the functional groups to groups of —SO$_3$Na whereby a cation exchange membrane reinforced as the membrane for alkali electrolysis was obtained.

The mechanical characteristics and the electrochemical characteristics of the membrane in the electrolysis of an aqueous solution of sodium chloride are shown in Table 1.

The condition of the electrolysis of an aqueous solution of sodium chloride was as follows.

The cation exchange membrane (effective area of 25 cm$^2$) was disposed between a ruthenium oxide coated titanium anode and an iron cathode oxide. The electrolysis was carried out by feeding 4N—NaCl aqueous solution at a rate of 150 ml/hour into the anode compartment and filling the cathode compartment with 8N—NaOH aqueous solution at the beginning and then, feeding water into the cathode compartment in the normal state at 85° C. under the condition of a current of 5A and a current density of 20 A/dm$^2$.

As the references, the mechanical and electrochemical characteristics of the cation exchange membranes (Reference E) a cation exchange membrane of a fluorinated polymer which was prepared by the same process except eliminating the fibrils of polytetrafluoroethylene; (Reference F) a cation exchange membrane of a fluorinated polymer reinforced with a woven fabric of polytetrafluoroethylene yarns (50 mesh, 200 denier) instead of the fibrils of polytetrafluoroethylene; and (Reference G) a cation exchange membrane of a fluorinated polymer containing 6 wt. % of the fibrils and polytetrafluoroethylene, are also shown in Table 1.

As it is clear from Table 1, the mechanical characteristics of the membranes were significantly improved in the cases containing the fibrils of polytetrafluoroethylene.

chemical characteristics were measured by the method of Example 1.

EXAMPLE 3

In accordance with the process of Example 1 except mixing 2.5 wt. % of fine powder of polytetrafluoroethylene having a specific surface area of 9.2 m$^2$/g and a secondary particle diameter of 470$\mu$ (Teflon 6AJ: manufactured by Mitsui Fluorochemical K.K.) with a cation exchange resin of a copolymer of $CF_2=CF_2$ and $CF_2=CFOCF_2CF(CF_3)O(CF_2)_2SO_2F$ having an ion exchange capacity of 0.9 meq/g polymer and $T_Q$ (temperature for a volumetric melt flow rate of 100 m$^3$/sec.) of 280° C., a membrane was fabricated.

One surface of the membrane was treated with 1.0 vol.% ammonia in air at the room temperature for 15 hours to convert a part of the groups of —SO$_2$F to —SO$_2$NH$_2$ and the modified surface of the membrane was disposed in the side of the cathode and the electrolysis of Example 1 was carried out.

The characteristics of the resulting cation exchange membrane are shown in Table 2 wherein the electrochemical characteristics were measured by the method of Example 1.

Table 1

|  | Example | | | | Reference | | |
| --- | --- | --- | --- | --- | --- | --- | --- |
|  | A | B | C | D | E | F | G |
| Fibrils of polytetrafluoroethylene (wt. %) | 1.0 | 2.0 | 2.5 | 3.7 | 0 | 0 | 6.0 |
| Tear strength (Kg/cm$^2$) | 2.5 | 3.9 | 5.4 | 7.0 | 2.0 | 3.5 | 8.0 |
| Flexural strength (times) | $2 \times 10^5$ | $4 \times 10^5$ | $5 \times 10^5$ | $7 \times 10^5$ | $10^5$ | $10^3$ | $10^6$ |
| Wearing test (mg) | 30 | 27 | 23 | 22 | 46 | 41 | 19 |
| Edge bursting strength(Kg/cm$^2$) | 2.9 | 3.1 | 3.3 | 3.6 | 2.3 | 4.0 | 4.0 |
| NaOH current efficiency for production of 30% NaOH (%) | 78 | 78 | 78 | 78 | 78 | 78 | 78 |
| Cell voltage (volt) | 3.5 | 3.5 | 3.5 | 3.5 | 3.5 | 3.7 | 3.5 |
| Condition of membrane after electrolysis for 30 days | None | None | None | Foam 1 | None | None | Foam 2 |

Note:
None: No change was found.
Foam 1: One foam having a diameter of 0.1 mm was formed in the membrane.
Foam 2: Four foam having diameter of 0.1 to 0.2 mm are formed in the membrane.

EXAMPLE 2

In accordance with the process of Example 1 except charging 10 g of ammonium perfluorooctanate, and feeding hexafluoropropylene at the time of feeding 1.35 Kg of additional tetrafluoroethylene to perform the polymerization of 2.7 Kg of tetrafluoroethylene in the presence of 0.7 mole % of hexafluoropropylene, a fine powder of polytetrafluoroethylene was produced. The resulting fine powder contained about 0.06 wt. % of hexafluoropropene units and had a specific surface area of 8.5 m$^2$/g and a secondary particle diameter of 480$\mu$.

On the other hand, the cation exchange resin of the copolymer of $CF_2=CF_2$ and $CF_2=CFOCF_2CF(CF_3)O(CF_2)_2SO_2F$ used in Example 1 was mixed with 2.5 wt. % of the resulting fine powder of polytetrafluoroethylene and a membrane was fabricated in accordance with the process and tests of Example 1.

The characteristics of the resulting cation exchange membrane are shown in Table 2 wherein the electro-

EXAMPLE 4

The cation exchange resin of Example 3 was swollen in trichlorotrifluoroethane and the swollen polymer was stirred by a homomixer at 5000 r.p.m. and the dispersion of polytetrafluoroethylene having a specific surface area of about 8 to 9 m$^2$/g (Teflon 42J: manufactured by Mitsui Fluorochemical K.K.) was added to the swollen polymer at a ratio of 2.5 wt.% and then the dispersion was broken by adding methanol. The mixture was dried and fabricated by the process of Example 1.

One surface of the membrane was treated with n-propyl amine at room temperature for 15 minutes to convert a part of the groups of —SO$_2$F to —SO$_2$NHR (R is n-propyl group) and the modified surface of the membrane was disposed in the side of the cathode and the electrolysis of Example 1 was carried out.

The characteristics of the resulting cation exchange membrane are shown in Table 2 wherein the electrochemical characteristics were measured by the method of Example 1.

EXAMPLE 5

A cation exchange resin of a copolymer of $CF_2=CF_2$ and (a) $CF_2=CFOCF_3$ and (b) $CF_2=CFOCF_2CF(CF_3)O(CF_2)_2SO_2F$ (a molar ratio of (a) to (b) is 1/7) having an ion exchange capacity of 0.85 meq/g polymer and $T_Q$ (temperature for volumetric melt flow rate of 100 mm$^3$/sec.) of 290° C. was mixed with 2.5 wt.% of a fine powder of polytetrafluoroethylene having a specific surface of 9.0 m$^2$/g and a secondary particle diameter of 470μ (Teflon 6J: manufactured by Mitsui Fluorochemical K.K.).

The mixture was extruded by an extruder having a diameter of 40 mm and L/D of 22 at 280° C. to form a membrane having a width of 40 cm and a thickness of 280μ.

The membrane was hydrolyzed by the process of Example 1 to obtain a cation exchange membrane incorporating the fibrils of polytetrafluoroethylene.

One surface of the membrane was treated with ethylene diamine at 20° C. for 30 minutes to convert a part of the functional groups to the groups of $—SO_2NHRNH_2$ and the modified surface of the membrane was disposed in the side of the cathode and the electrolysis of Example 1 was carried out.

The characteristics of the resulting cation exchange membrane are shown in Table 2 wherein the electrochemical characteristics were measured by the method of Example 1.

EXAMPLE 6

The cation exchange membrane used in Example 1 was treated with 1N-HCl to convert it to H-type membrane. The membrane was heated in a mixture of phosphorus pentachloride and phosphorus oxychloride at a ratio of 1:1 under refluxing at 120° C. for 20 hours to convert it to sulfonyl chloride type membrane. After the reaction, the membrane was washed with carbon tetrachloride.

The membrane was held between two sheets of frames made of acryl resin with packings made of polytetrafluoroethylene. The membrane held between the frames was dipped in 55% of an aqueous solution of hydroiodic acid at 80° C. for 24 hours to react only one side surface of the membrane.

The membrane was hydrolyzed in an aqueous solution of 2,5N—NaOH and 20% methanol at 60° C. for 16 hours to form a cation exchange membrane whose one side surface was carboxylic acid type and whose other side surface was sulfonic acid type.

The carboxylic acid type surface of the membrane was disposed in the side of the cathode and the electrolysis of Example 1 except forming a concentration of 37% of NaOH, was carried out. The characteristics of the electrolysis are shown in Table 2.

Table 2

|  | Example 2 | Example 3 | Example 4 | Example 5 | Example 6 |
|---|---|---|---|---|---|
| Tear strength (Kg/cm$^2$) | 5.4 | 5.1 | 5.2 | 5.0 | 5.0 |
| Flexural strength (times) | $5 \times 10^5$ | $2 \times 10^5$ | $2 \times 10^5$ | $2 \times 10^5$ | $3 \times 10^5$ |
| NaOH current efficiency for production of 25% NaOH (%) | 68 | 83 | 85 | 87 | 91 |
| Cell voltage (volt) | 3.4 | 3.6 | 3.7 | 3.9 | 3.9 |

EXAMPLE 7

A fabric made of polytetrafluoroethylene (50 mesh: 100 denier) was superposed and pressed on each of the membranes of A, B, C, D, E and G in Example 1 at 195° C. under the pressure of 30 Kg/cm$^2$ for 5 minutes by a press machine. The resulting membranes A', B', C', D', E' and G' were respectively treated in accordance with the process of Example 1 to prepare the membranes for electrolysis.

The characteristics of the resulting cation exchange membrane are shown in Table 3 wherein the electrochemical characteristics were measured by the method of Example 1.

Table 3

|  | Example | | | | Reference | |
|---|---|---|---|---|---|---|
|  | A' | B' | C' | D' | E' | G' |
| Fibrils of polytetrafluoroethylene (wt.%) | 1.0 | 2.0 | 2.5 | 3.7 | 0 | 6.0 |
| Tear strength (extruding direction) (Kg/cm$^2$) | 32 | 33 | 35 | 35 | 31 | 35 |
| Flexural strength (times) | $6 \times 10^3$ | $9 \times 10^4$ | $1.2 \times 10^4$ | $2 \times 10^4$ | $4 \times 10^3$ | $7 \times 10^4$ |
| NaOH current efficiency for production of 30% NaOH (%) | 78 | 78 | 78 | 78 | 78 | 78 |
| Cell voltage (volt) | 3.5 | 3.5 | 3.5 | 3.5 | 3.5 | 3.5 |
| Condition of | None | None | None | Foam 1 | None | Form 2 |

Table 3-continued

| | Example | | | | Reference |
|---|---|---|---|---|---|
| A' | B' | C' | D' | E' | G' | membrane after
electrolysis for
30 days

What is claimed is:

1. A cation exchange membrane of a fluorinated polymer for electrolysis which comprises 0.5 to 2.8 wt.% of fibrils of polytetrafluoroethylene in a cation exchange resin of a perfluorocarbon polymer having sulfonic acid type ion exchange groups thereon, wherein said fibrils are formed by applying a high shear stress to particles of polytetrafluoroethylene.

2. A cation exchange membrane according to claim 1 wherein the electrolysis is an electrolysis of an alkali metal chloride to produce an alkali metal hydroxide and the cation exchange resin is a perfluorocarbon polymer having high chlorine resistance and high alkaline resistance.

3. A cation exchange membrane according to claim 2 wherein the sulfonic acid type ion exchange group is a group of —SO₃M wherein M represents hydrogen or alkali metal atom or a functional group which can be converted to the group of —SO₃M.

4. A cation exchange membrane according to claim 2, wherein the cation exchange resin has an ion exchange capacity of 0.5 to 2.5 meq/g dry polymer.

5. A cation exchange membrane according to claim 2 wherein the perfluorocarbon polymer has units of (a) $-\!\!+\!\mathrm{CF_2-CXX'}\!+\!-$ and

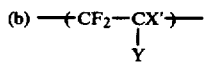

at a ratio of 5 to 40 mole % of the units

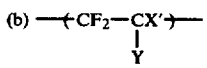

wherein X represents fluorine atom or —CF₃; X' represents X or $CF_3(CF_2)_{\overline{m}}$; m represents 1 to 5; and Y represents $-\!\!+\!CF_2\!\!+\!_x\!A$, $-\!O\!\!+\!CF_2\!\!+\!_x\!A$,

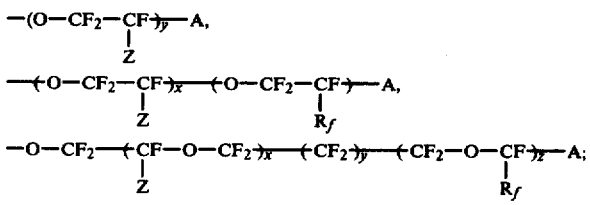

wherein x, y and z respectively represent 1 to 10; Z and R_f respectively represent —F or a C₁-C₁₀ perfluoroalkyl group; A represents —SO₃M, or a combination of —SO₃M and a group which can be acted as ion exchange group of —SO₂NH₂, —SO₂—NHR, —SO₂NH—(CH₂)_n—NH₂ or —COOM wherein M represents hydrogen or alkali metal atom and R represents a C₁-C₁₀ alkyl group and n represents 1 to 10.

6. A cation exchange membrane according to claim 1 wherein the fibrils of polytetrafluoroethylene are fibrils of polytetrafluoroethylene having a specific surface area of 3 to 30 cm²/g prepared by an emulsion polymerization.

7. A cation exchange membrane according to claim 1 or 6 wherein the fibrils of polytetrafluoroethylene are fibrils of copolymer of tetrafluoroethylene having less than 5 mole % of units of a comonomer having the formula

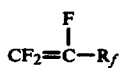

or

wherein R_f represents a C₁-C₁₀ fluoroalkyl group.

8. A process for preparing a cation exchange membrane of a fluorinated polymer for electrolysis which comprises mixing a polytetrafluoroethylene powder with a perfluorocarbon cation exchange resin containing sulfonic acid ion exchange groups or functional groups which can be converted to sulfonic acid ion exchange groups; kneading the said mixture; applying a shear stress to said powder so as to form fibrils of polytetrafluoroethylene, and thereafter fabricating said fibril containing mixture into a membrane, wherein said membrane comprises 0.5 to 2.8 wt.% of fibrils.

9. A process according to claim 8 wherein the fibrils of polytetrafluoroethylene are formed at higher than 100° C. and lower than the melting point of the polytetrafluoroethylene.

10. A process according to claim 8 wherein the polytetrafluoroethylene has a secondary particle diameter of less than 5 mm.

11. A process according to claim 8 or 9 wherein the polytetrafluoroethylene is produced by an emulsion polymerization.

* * * * *